C. E. BRANSON.
STARTER FOR INTERNAL COMBUSTION ENGINES.
APPLICATION FILED MAR. 23, 1915.
1,178,989.
Patented Apr. 11, 1916.
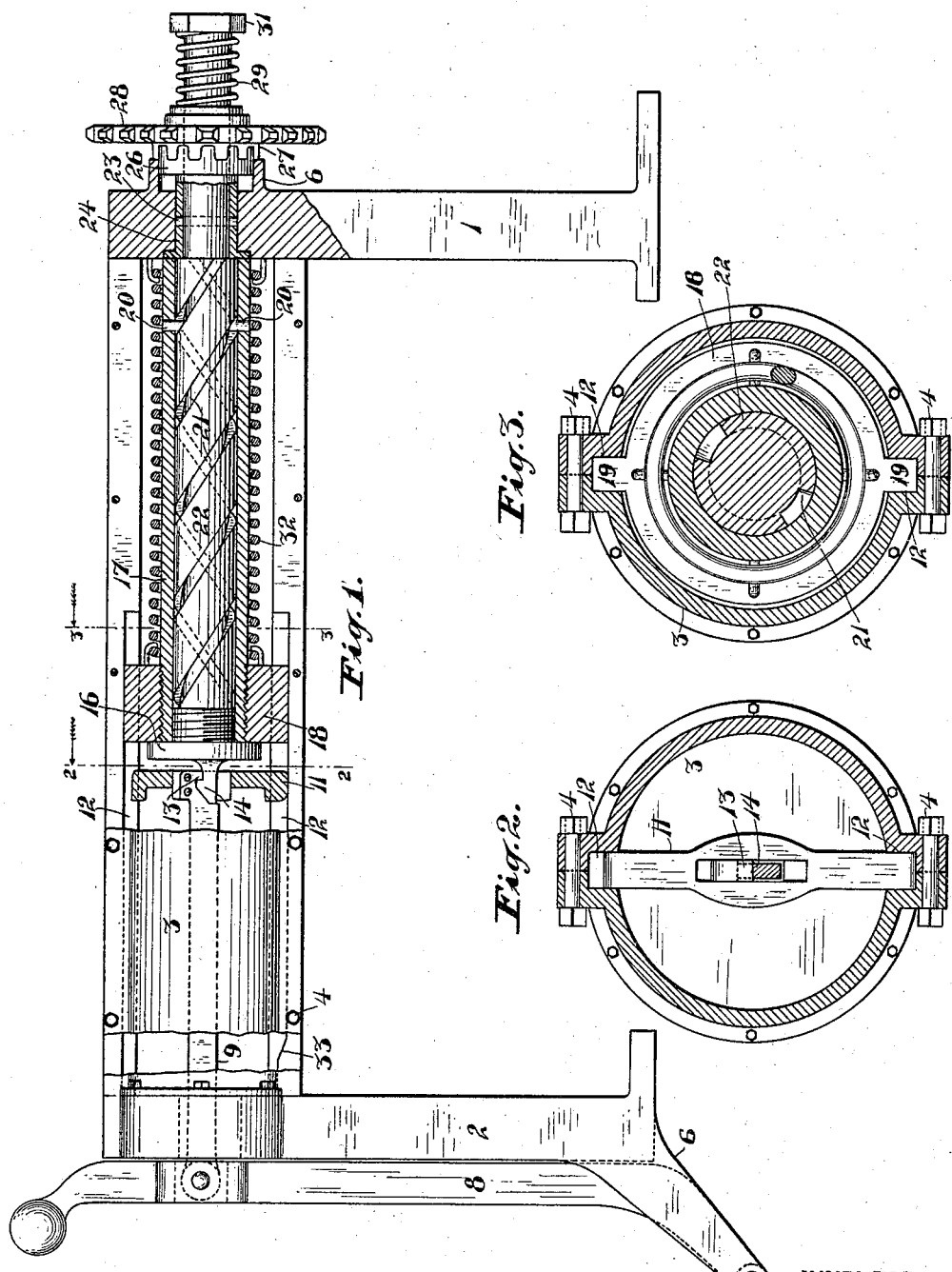
WITNESSES:
INVENTOR.
C. E. Branson
BY
ATTORNEY

UNITED STATES PATENT OFFICE.

CHARLES E. BRANSON, OF PALO ALTO, CALIFORNIA.

STARTER FOR INTERNAL-COMBUSTION ENGINES.

1,178,989.  Specification of Letters Patent.  Patented Apr. 11, 1916.

Application filed March 23, 1915. Serial No. 16,434.

*To all whom it may concern:*

Be it known that I, CHARLES E. BRANSON, a citizen of the United States, residing at Palo Alto, in the county of Santa Clara and State of California, have invented new and useful Improvements in Starters for Internal-Combustion Engines, of which the following is a specification.

The object of the present invention is to provide an improved starter for internal combustion engines which can be operated from the seat to start any automobile, which will be reliable in its action, which will not rattle when the automobile is in motion, which can be attached to any motor used for propelling the automobile, and will turn the motor three revolutions every time applied.

In the accompanying drawing, Figure 1 is a longitudinal section, partly in side elevation, of my improved apparatus; Figs. 2 and 3 are transverse sections on the lines 2—2 and 3—3 respectively of Fig. 1.

Referring to the drawing, 1, 2 indicate front and rear frame pieces connected by a cylindrical casing 3, in two sections bolted together, as shown at 4. Said rear frame piece has a rearward extension 6, to which is pivoted, as shown at 7, a lever 8, which lever is pivotally attached to the rear end of a link 9, the front end of which is connected to a slide-piece 11, the ends of which move in grooves 12 in said cylinder. A hook 13 on the slide piece can engage a hook 14 on a head 16 attached to a cylinder 17, one end of which is screwed into a cross head 18, which has lugs or extensions 19 which slide in said grooves 12. Pins 20 extending inwardly from the cylinder enter spiral grooves 21 in a shaft 22, within, and slidably engaging, the cylinder. The forward end of said shaft is reduced, and surrounding, and pinned, as shown at 23, to, said reduced end is a sleeve 24, carrying at its forward end a clutch member 26 adapted to engage a clutch member 27 rigid with a sprocket wheel 28 loose on the shaft 22, and pressed rearwardly by a coiled spring 29 compressed between said sprocket wheel 28 and a nut 31 on said shaft. Said sprocket wheel 28 is operatively connected, by means not here shown, with the engine shaft.

A coiled spring 32 surrounds the cylinder and is connected at one end with the head 16 and at the other end to the front frame.

When the lever is swung backward, the slide-piece 11 also moves backward, drawing with it the cylinder 17. The backward pressure of the pins 20 against the grooves 21 in the shaft 22 moves said shaft backward until arrested by the engagement of the clutch member 26 with the front frame 1 and withdraws said clutch member out of engagement with the clutch member 27. It also causes the shaft 22 to rotate, but such rotation does not impart rotation to the sprocket wheel, since the clutch members 26, 27 are now disengaged. When the slide piece 11 has nearly reached the rear frame piece 2, its lower end engages a raised portion 33 in the lower groove 12, causing the slide piece to move transversely in said groove 12, and thereby to disengage the hook 13 from the hook 14 attached to the cylinder. Thereupon the cylinder immediately moves forward longitudinally under the action of the spring 32, and thereby first causes the shaft to move forwardly and the clutch 26 to engage the clutch 27, and then imparts rotation in the opposite direction to the threaded shaft, thereby rotating the sprocket wheel 28 and rotating the engine shaft.

I claim:—

In combination, a shaft, a spiral groove, means, operative in one direction of rotation of the shaft, but inoperative in its other direction of rotation, for transmitting rotary motion from said shaft to the shaft of an engine, a cylinder coaxial with the shaft and having a pin engaging said groove, a device for moving the cylinder in one direction longitudinally and a spring for so moving it in the other direction.

In testimony whereof I have hereunto set my hand in the presence of two subscribing witnesses.

CHARLES E. BRANSON.

Witnesses:
F. M. WRIGHT,
D. B. RICHARDS.

Copies of this patent may be obtained for five cents each, by addressing the "Commissioner of Patents, Washington, D. C."